United States Patent
Bogdan

(10) Patent No.: US 11,436,853 B1
(45) Date of Patent: Sep. 6, 2022

(54) DOCUMENT AUTHENTICATION

(71) Applicant: Idemia Identity & Security USA LLC, Billerica, MA (US)

(72) Inventor: Alexandru Bogdan, New York, NY (US)

(*) Notice: Subject to any disclaimer, the term of this patent is extended or adjusted under 35 U.S.C. 154(b) by 39 days.

(21) Appl. No.: 16/830,114

(22) Filed: Mar. 25, 2020

Related U.S. Application Data

(60) Provisional application No. 62/823,138, filed on Mar. 25, 2019.

(51) Int. Cl.
| | |
|---|---|
| *G06V 30/418* | (2022.01) |
| *G06T 7/40* | (2017.01) |
| *G06F 16/93* | (2019.01) |
| *G06F 16/56* | (2019.01) |
| *G06V 10/22* | (2022.01) |
| *G06V 10/40* | (2022.01) |

(52) U.S. Cl.
CPC ............ *G06V 30/418* (2022.01); *G06F 16/56* (2019.01); *G06F 16/93* (2019.01); *G06T 7/40* (2013.01); *G06V 10/22* (2022.01); *G06V 10/40* (2022.01); *G06T 2207/30176* (2013.01)

(58) Field of Classification Search
USPC .......................... 382/108, 112, 195; 356/71
See application file for complete search history.

(56) References Cited

U.S. PATENT DOCUMENTS

| | | | | |
|---|---|---|---|---|
| 6,038,016 A * | 3/2000 | Jung | ..................... | G01N 21/474 356/71 |
| 7,552,120 B2 * | 6/2009 | Essafi | ..................... | G06F 16/41 707/999.102 |
| 7,995,196 B1 * | 8/2011 | Fraser | ................... | G06V 10/147 356/71 |
| 9,014,481 B1 * | 4/2015 | Luqman | ............... | G06V 10/469 382/185 |
| 9,019,570 B1 * | 4/2015 | Kanneganti | .......... | G06V 30/418 358/448 |
| 9,779,296 B1 * | 10/2017 | Ma | ........................ | G06V 30/414 |
| 2004/0117367 A1 * | 6/2004 | Smith | ..................... | G06F 16/71 707/999.005 |
| 2006/0127880 A1 * | 6/2006 | Harris | .................... | G06V 20/69 382/128 |

(Continued)

FOREIGN PATENT DOCUMENTS

WO WO-2014163014 A1 * 10/2014 ............. G06F 16/51

OTHER PUBLICATIONS

Imran et al, "performing the texture analysis includes measuring a scaling property using a similarity dimension." 2014 IEEE pp. 30-33 (Year: 2014).*

*Primary Examiner* — Kathleen Y Dulaney
(74) *Attorney, Agent, or Firm* — Adam Lewental; Robert Facey

(57) ABSTRACT

A document inspection system performs texture analysis on a portion of a first image that represents a first document and on a portion of a second image that represents a second document; performing. Feature vectors for the regions from the first and second documents are compared. If the feature vectors have a threshold degree of similarity, they may be identified as being sufficiently related. This may have applicability, for example, in determining with a first document is valid because reflects sufficiently-similar characteristics to those of a reference document.

16 Claims, 8 Drawing Sheets

(56) References Cited

U.S. PATENT DOCUMENTS

| | | | | |
|---|---|---|---|---|
| 2006/0251326 A1* | 11/2006 | Yeh | ................... | G06V 30/412 |
| | | | | 382/176 |
| 2008/0069427 A1* | 3/2008 | Liu | ..................... | G06V 10/26 |
| | | | | 382/137 |
| 2008/0152238 A1* | 6/2008 | Sarkar | ................ | G06V 30/40 |
| | | | | 382/228 |
| 2009/0154781 A1* | 6/2009 | Bogdan | ................ | G06T 7/42 |
| | | | | 382/128 |
| 2014/0140571 A1* | 5/2014 | Elmenhurst | ........ | G06V 30/424 |
| | | | | 382/101 |
| 2014/0334721 A1* | 11/2014 | Cervin | .............. | G06V 30/414 |
| | | | | 382/160 |
| 2015/0178563 A1* | 6/2015 | Galleguillos | ......... | G06F 16/93 |
| | | | | 382/218 |
| 2016/0012658 A1* | 1/2016 | Lohweg | .............. | G06V 10/17 |
| | | | | 382/135 |
| 2016/0028921 A1* | 1/2016 | Thrasher | ............ | H04N 1/60 |
| | | | | 358/519 |
| 2017/0287252 A1* | 10/2017 | Laddha | ............... | G06V 10/44 |
| 2019/0102873 A1* | 4/2019 | Wang | ................. | G06K 9/6268 |
| 2019/0138649 A1* | 5/2019 | Sullivan | ............. | G06V 30/414 |
| 2020/0226772 A1* | 7/2020 | Xiang | .................. | G06T 7/42 |
| 2021/0117529 A1* | 4/2021 | Zamora Martínez | ........ | |
| | | | | H04W 12/06 |

* cited by examiner

DOCUMENT AUTHENTICATION

CROSS-REFERENCE TO RELATED APPLICATION

This application claims the benefit of the filing date of U.S. Provisional Application No. 62/823,138, filed on Mar. 25, 2019. The contents of U.S. Application No. 62/823,138 are incorporated herein by reference in their entirety.

TECHNICAL FIELD

This generally relates to document inspection technologies.

BACKGROUND

Documents are often relied upon in commerce to authenticate the bearer of the document, or as proof that the underlying document itself is what it purports to be. Similarly, governments often require authentication for various tasks, such as ensuring proper operation of a vehicle or to pass through a physical security perimeter. There is often a struggle between those introducing documents as they seek to employ technology to deter illicit efforts, and those seeking to catch up to the newly-introduced technology in order to secure illicit benefits. Increasing the technological sophistication of the document producers, and the techniques by which documents are inspected can give those relying on authenticity increased confidence.

SUMMARY

In one sense, documents may be inspected a computing device may perform texture analysis on a portion of a first image that represents a first document and on a portion of a second image that represents a second document. Based on performing texture analysis on the portion of the first image that represents the first document, the computing device may generate a first feature vector that represents the portion of the first image that represents the first document. Based on performing texture analysis on the portion of the second image that represents the second document, the computing device may generate, a second feature vector that represents the portion of the second image that represents the second document. The computing device then compares the first feature vector to the second feature vector. Based on comparing the first feature vector to the second feature vector, the computing device determines a confidence score that reflects a likelihood that the first document and the second document are the same document. The computing device then compares the confidence score to a confidence score threshold. Based on comparing the confidence score to the confidence score threshold, the computing device then determines whether the confidence score satisfies the confidence score threshold. Based on determining whether the confidence score satisfies the confidence score threshold, the computing device determines whether the first document and the second document are the same document.

The details of one or more aspects are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
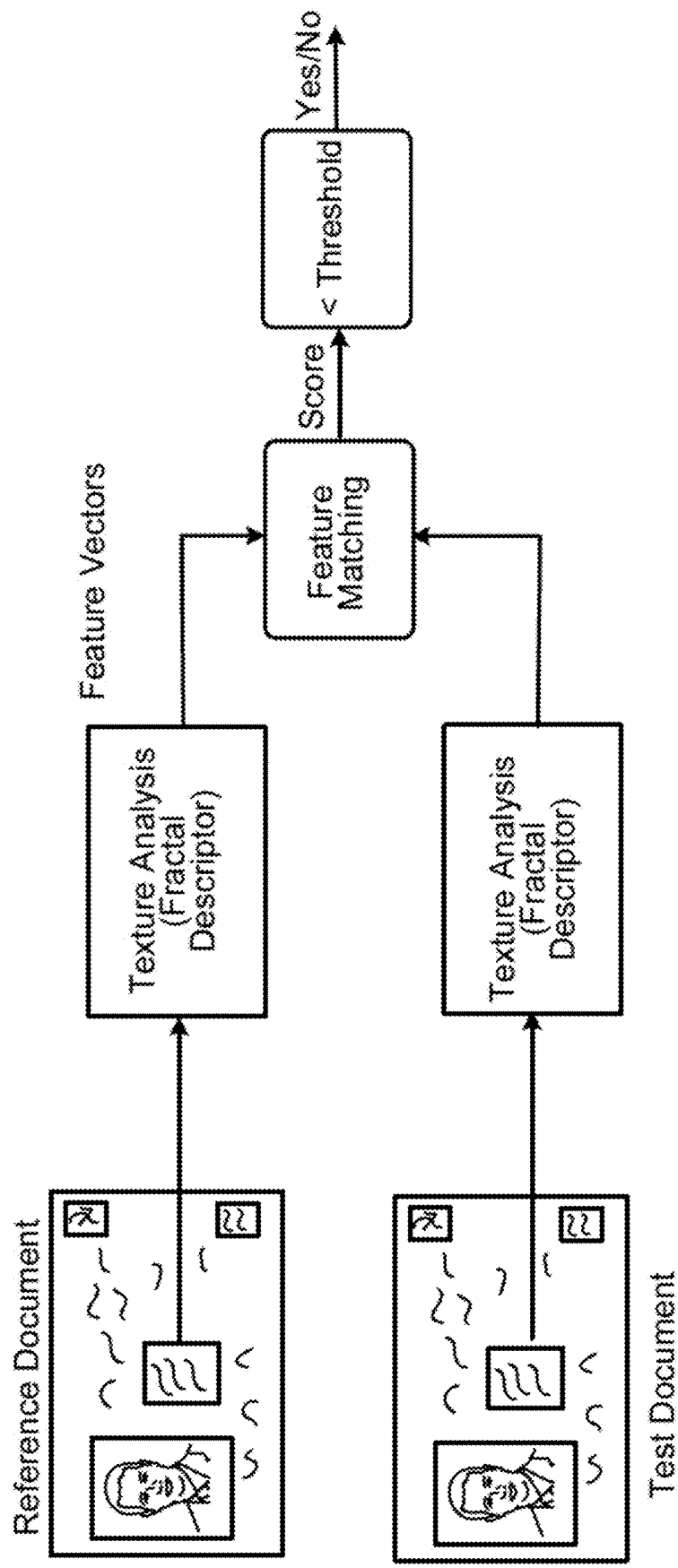
FIG. 1 illustrates an example texture matching pipeline for document authentication using fractal descriptors.

Identification document verification is part of peoples' day to day routines and is used in, for example, bank activity or border crossing. Technological advances in signal and image processing and printing technology are available at a reasonable cost and make it possible to create high quality fake identification documents. A person may have a hard time detecting a high quality fake identification document. In some implementations, a computing device may use advanced machine learning and signal and image processing methods to detect the difference in the scanned image signature of the printing technology used to create a fake document.

An example method to detect differences in the printing technology is to focus on the analysis of the background printing. Usually, the background of an identification document is composed of fine lines or a repetitive pattern. From the perspective of image processing, these types of patterns are identified as textures. Depending on the printing process and the quality of the printer, the image on the document may have subtle changes. In the texture area of the document, the original pattern may be the same across all documents and the relative strength of the printing generated disturbance and signal (e.g., texture pattern) is larger and perhaps more detectable using texture analysis.

The discussion below describes a method that will improve automatic fake document detection from background printing. In some implementations, a vector of features from a region of interest from the scanned document being tested is compared to a reference model or processed using a classifier trained on known valid documents. These features may be created using a texture analysis methods. In some implementations, the system extracts new information from the region of interest using fractal descriptors. The fractal descriptors capture the signal changes as a function of scale and can be used on their own or in addition to the other features under consideration.

In some implementations, a system may use image processing and statistical and structural features to characterize the printing process as part of automatic fake document detection. In some implementations, a system may use machine learning and statistical texture analysis methods such as DCT, wavelets, noise analysis, and gradient analysis to detect fake documents over a large variety of printing techniques.

In some implementations, a fractal dimension may be a good metric to characterize a texture area in an image. In some instances, fractal signal and image processing may be used in applications such as biometrics and medical diagnosis.

In some implementations, the method described below improves the performance of automatic fake document detection. It can be used as a standalone method for document authentication or in conjunction with other methods to increase overall performance. The method uses fractal descriptors for texture characterization and feature generation from scanned documents. These features are matched to a reference set to decide the validity of a document. This method extracts information that may not be available in other implementations.

In some implementations, a texture analysis method may be based on the computation of some statistics and/or a fixed or collection of fixed scale representations of the data, for example, an image region.

In some implementations, fractal descriptors may result from the evaluation of some kind of fractal dimension during processing of the data. The fractal dimension captures the change of a measured property as a change in the scale, of the data, at which it is measured. Examples of fractal dimensions include self-similarity and lacunarity.

An example model for detection of fraud from scanned identity documents compares the test document to a reference. One of the validation steps is to compare the texture features in a small area of the documents. In some implementations, several texture measures may be used. The discussion below describes using fractal texture descriptors to compare the same region in the two scanned documents.

FIG. 1 illustrates an example texture matching pipeline for document authentication using fractal descriptors. As shown in FIG. 1, small regions of each document that are known to contain only texture are compared. In some implementations, the method uses a fractal framework to generate a feature vector from the analyzed texture region. Scaling properties can be measured using the similarity dimension D. In some implementations, similarity connects a measured quantity Ns, and the scale s at which it is measured. The similarity dimension D can be estimated from the (log (1/s), log (Ns)) plot of the data. For the perfect fractal, the plot is a straight line and D is the line slope. The plot of real data with fractal properties may be close to a line. The method can estimate D from the slope of the regression line which best fits the data over a finite range of scales s.

As an example, using a box counting method, the method thresholds a texture region at the intensity mean, setting pixels larger than the threshold to 1 and less than the threshold to 0. The method covers the resulting binary region with a set of non-overlapping squares of size s, at scale s. The method counts the number of squares that have at least one pixel of value 1 and stores the result in the variable Ns. The method uses the values computed over a range of scales to compute a similarity dimension D. The method uses different thresholds in the texture region to compute a set of similarity dimensions that are collected in the feature vector. The fractal feature vectors for the reference and test images are compared to each other to make a decision if they come from a valid document or not.

Figure 2:
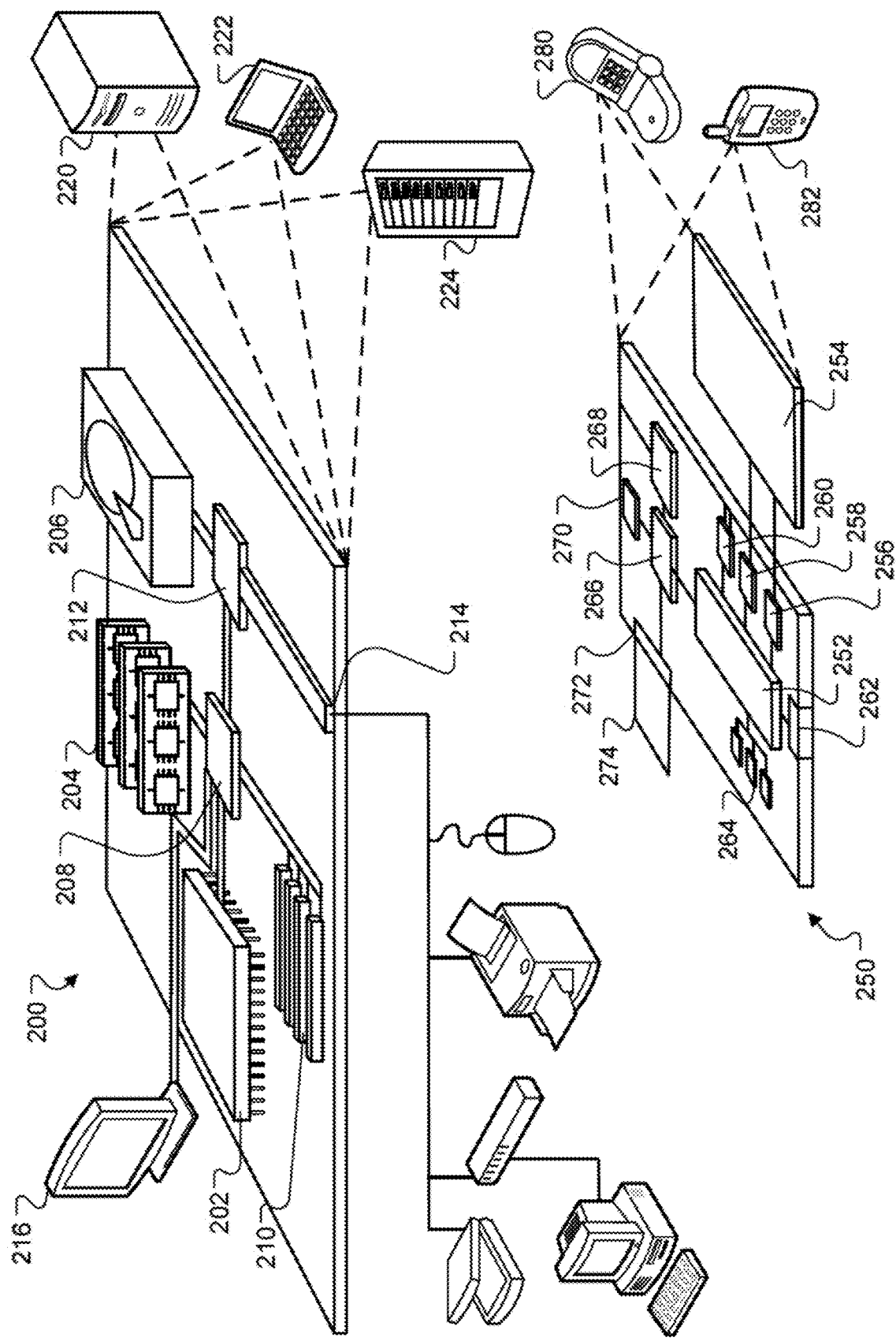
FIG. 2 is an example of a computing device and a mobile computing device.

FIG. 2 shows an example of a computing device 200 and a mobile computing device 250 that can be used to implement the techniques described here. The computing device 200 is intended to represent various forms of digital computers, such as laptops, desktops, workstations, personal digital assistants, servers, blade servers, mainframes, and other appropriate computers. The mobile computing device 250 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 200 includes a processor 202, a memory 204, a storage device 206, a high-speed interface 208 connecting to the memory 204 and multiple high-speed expansion ports 210, and a low-speed interface 212 connecting to a low-speed expansion port 214 and the storage device 206. Each of the processor 202, the memory 204, the storage device 206, the high-speed interface 208, the high-speed expansion ports 210, and the low-speed interface 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as a display 216 coupled to the high-speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 204 stores information within the computing device 200. In some implementations, the memory 204 is a volatile memory unit or units. In some implementations, the memory 204 is a non-volatile memory unit or units. The memory 204 may also be another form of computer-readable medium, such as a magnetic or optical disk.

The storage device 206 is capable of providing mass storage for the computing device 200. In some implementations, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 202), perform one or more methods, such as those described above. The instructions can also be stored by one or more storage devices such as computer- or machine-readable mediums (for example, the memory 204, the storage device 206, or memory on the processor 202).

The high-speed interface 208 manages bandwidth-intensive operations for the computing device 200, while the low-speed interface 212 manages lower bandwidth-intensive operations. Such allocation of functions is an example only. In some implementations, the high-speed interface 208 is coupled to the memory 204, the display 216 (e.g., through a graphics processor or accelerator), and to the high-speed expansion ports 210, which may accept various expansion cards (not shown). In the implementation, the low-speed interface 212 is coupled to the storage device 206 and the low-speed expansion port 214. The low-speed expansion port 214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. In addition, it may be implemented in a personal computer such as a laptop computer 222. It may also be implemented as part of a rack server system 224. Alternatively, components from the computing device 200 may be combined with other components in a mobile device (not shown), such as a mobile computing device 250. Each of such devices may contain one or more of the computing device 200 and the mobile computing device 250, and an entire system may be made up of multiple computing devices communicating with each other.

The mobile computing device 250 includes a processor 252, a memory 264, an input/output device such as a display 254, a communication interface 266, and a transceiver 268, among other components. The mobile computing device 250 may also be provided with a storage device, such as a micro-drive or other device, to provide additional storage. Each of the processor 252, the memory 264, the display 254, the communication interface 266, and the transceiver 268, are interconnected using various buses, and several of the components may be mounted on a common motherboard or in other manners as appropriate.

The processor 252 can execute instructions within the mobile computing device 250, including instructions stored in the memory 264. The processor 252 may be implemented as a chipset of chips that include separate and multiple analog and digital processors. The processor 252 may provide, for example, for coordination of the other components of the mobile computing device 250, such as control of user interfaces, applications run by the mobile computing device 250, and wireless communication by the mobile computing device 250.

The processor 252 may communicate with a user through a control interface 258 and a display interface 256 coupled to the display 254. The display 254 may be, for example, a TFT (Thin-Film-Transistor Liquid Crystal Display) display or an OLED (Organic Light Emitting Diode) display, or other appropriate display technology. The display interface 256 may comprise appropriate circuitry for driving the display 254 to present graphical and other information to a user. The control interface 258 may receive commands from a user and convert them for submission to the processor 252. In addition, an external interface 262 may provide communication with the processor 252, so as to enable near area communication of the mobile computing device 250 with other devices. The external interface 262 may provide, for example, for wired communication in some implementations, or for wireless communication in other implementations, and multiple interfaces may also be used.

The memory 264 stores information within the mobile computing device 250. The memory 264 can be implemented as one or more of a computer-readable medium or media, a volatile memory unit or units, or a non-volatile memory unit or units. An expansion memory 274 may also be provided and connected to the mobile computing device 250 through an expansion interface 272, which may include, for example, a SIMM (Single In Line Memory Module) card interface. The expansion memory 274 may provide extra storage space for the mobile computing device 250, or may also store applications or other information for the mobile computing device 250. Specifically, the expansion memory 274 may include instructions to carry out or supplement the processes described above, and may include secure information also. Thus, for example, the expansion memory 274 may be provide as a security module for the mobile computing device 250, and may be programmed with instructions that permit secure use of the mobile computing device 250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 252), perform one or more methods, such as those described above. The instructions can also be stored by one or more storage devices, such as one or more computer- or machine-readable mediums (for example, the memory 264, the expansion memory 274, or memory on the processor 252). In some implementations, the instructions can be received in a propagated signal, for example, over the transceiver 268 or the external interface 262.

The mobile computing device 250 may communicate wirelessly through the communication interface 266, which may include digital signal processing circuitry where necessary. The communication interface 266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 268 using a radio-frequency. In addition, short-range communication may occur, such as using a Bluetooth, WiFi, or other such transceiver (not shown). In addition, a GPS (Global Positioning System) receiver module 270 may provide additional navigation- and location-related wireless data to the mobile computing device 250, which may be used as appropriate by applications running on the mobile computing device 250.

The mobile computing device 250 may also communicate audibly using an audio codec 260, which may receive spoken information from a user and convert it to usable digital information. The audio codec 260 may likewise generate audible sound for a user, such as through a speaker, e.g., in a handset of the mobile computing device 250. Such sound may include sound from voice telephone calls, may include recorded sound (e.g., voice messages, music files, etc.) and may also include sound generated by applications operating on the mobile computing device 250.

The mobile computing device 250 may be implemented in a number of different forms, as shown in the figure. For example, it may be implemented as a cellular telephone 280. It may also be implemented as part of a smart-phone 282, personal digital assistant, or other similar mobile device.

FIGS. 3A-3D are examples of how textures can be encoded and read for a portion of a first image that will later be compared to a reference texture.

Figure 3A:
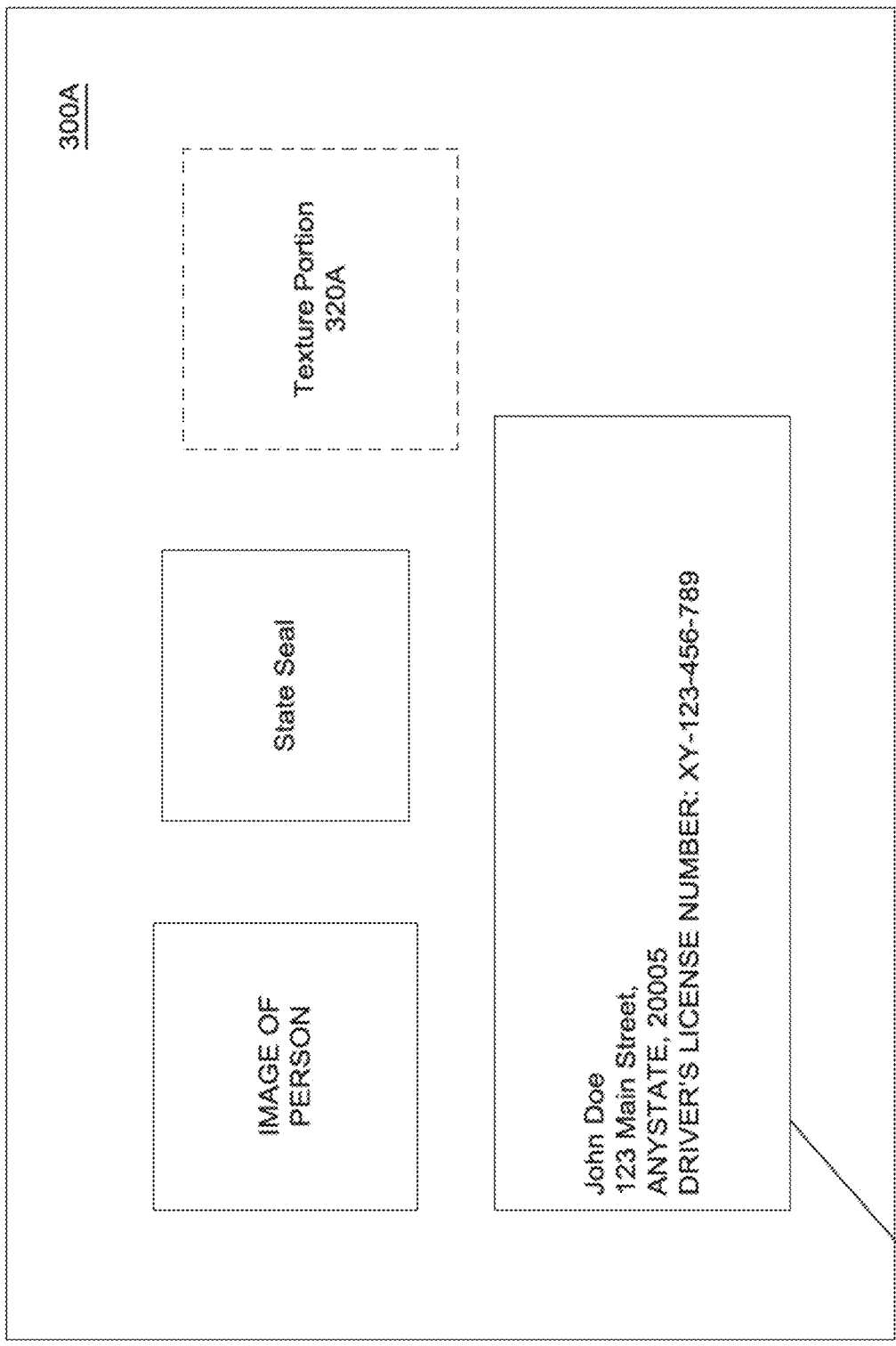
FIGS. 3A-3D are examples of how textures can be encoded and read for a portion of a first image that will later be compared to a reference texture.

FIG. 3A illustrates how different portions of a texture can be inspected. For example, and as is shown in a first implementation with document 300A, the portion of texture directly appearing to the right of a name may inspected. An inspection system may maintain a reference for each user. Based on the known length of the name and the reference pattern that should appear to the right of the name, the designated portion could be inspected in order to compare texture. In this case, the texture may include, for example, a 1×1 cm square region with an identifiable texture.

Figure 3B:
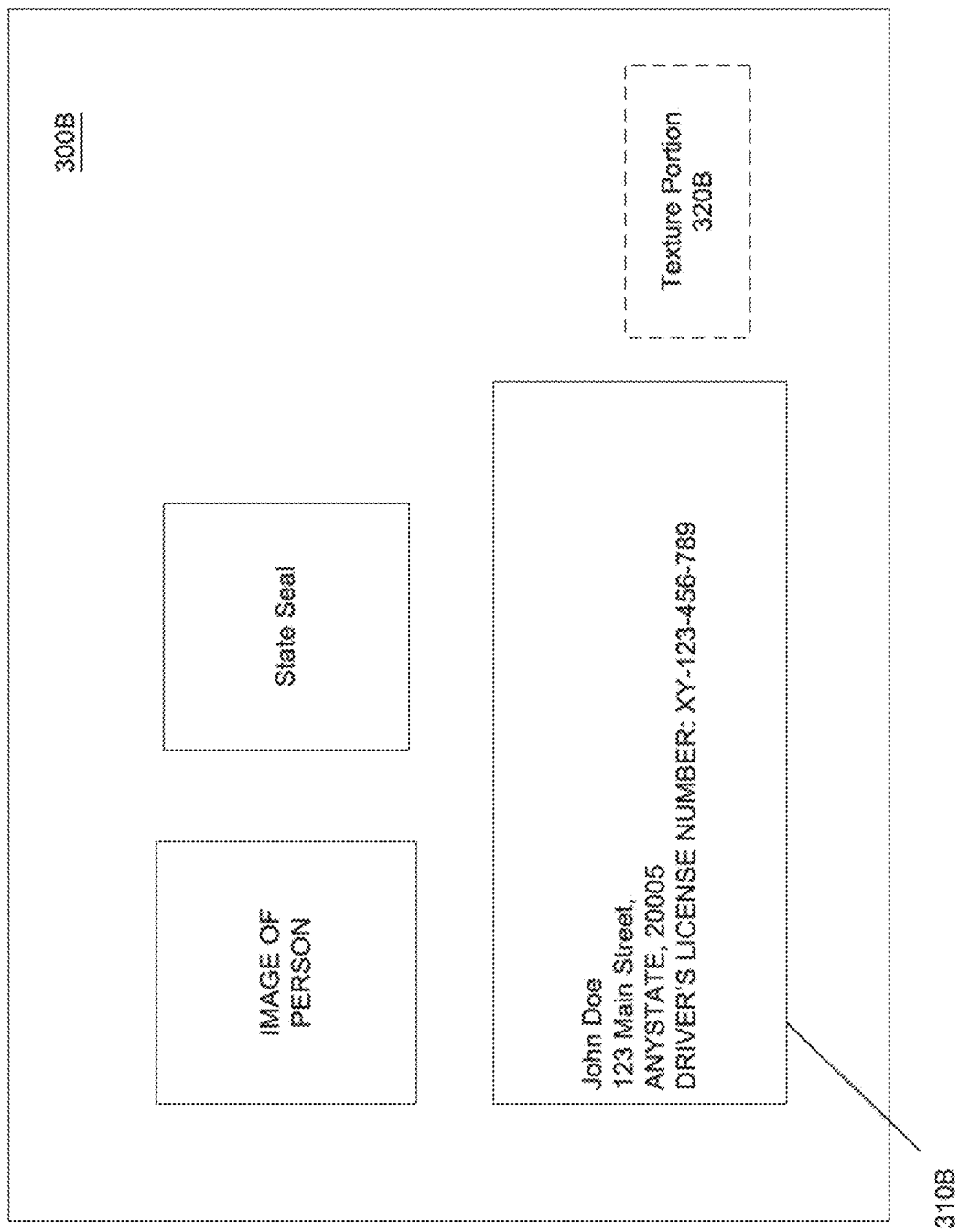

FIG. 3B illustrates how a textures can be identified relative to known markers in a document 300B. Document 300B illustrates how the texture appearing in 320B can be maintained relative to a known position in a document, such as across from a particular serial number. For example, an inspection system can perform a hash operation on the document serial number to identify one of several textures that are used in the class of driver's licenses, such as that which appears driver information 310B. This approach would provide a degree of randomness while also simplifying the storage requirements for different templates.

In other examples not shown, a corner or compass marker within the document may be used to identify a coordinate system within the document itself. Once a corner has been identified, an inspection system (e.g., a wireless device with a camera or a specialized system configured to inspect documents) may perform a quick optical assessment to identify easier and difficult portions of a document to read. Wireless phones may not be able to establish a completely planar read of the document 300B. Even where a planar read is attained, glare from peripheral light sources may cause overexposure of key portions of the underlying documents. Thus, the inspection system may be used identify on and inspect those portions not subject to glare (or oil or smudges) appearing over a document. These effects can be more pronounced where the document is laminated with a polycarbonate shell. The inspection system may be configured to capture data on more than one data frame and for more than one region of interest. The inspection device then can perform preliminary processing in order to identify a suitable portion for inspection. Once the suitable area has been identified, the inspection system can perform a texture analysis in order to make a determination that the document is valid.

In another example (not shown), the document may be subject to two imaging operations. A first image capture operation may be used to assist in performing a second image capture operation. For example, instead of identifying a threshold degree of similarity, the first operation may be used to generate a value. The value then may be used in a second operation. For example, the value from the first operation may be used to identify which portion should be inspected to perform a texture analysis.

Figure 3C:
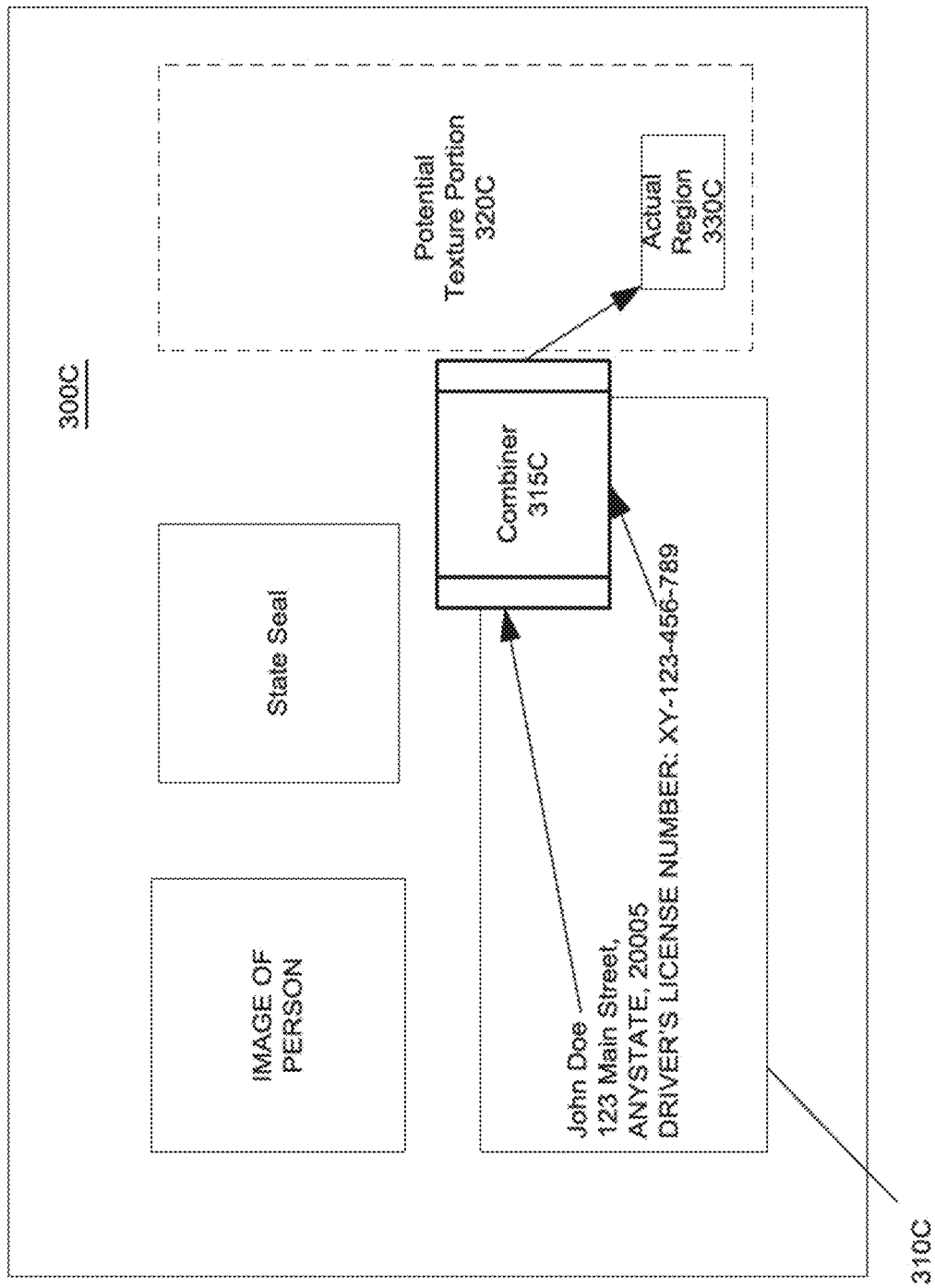

In FIG. 3C, document 300C illustrates how even more customization would be performed. In this case, a last name plus serial number appearing in driver information 310C are concatenated to reveal a larger value. Logically, this is performed by a combiner 315C that would be resident in a document inspection station 330(C). This larger value then may be the subject of a hash (or more complex cryptographic hash based on a previously stored user key). The remainder of this operation then may be used to identify which texture has been employed in potential textual region 320C. The potential textual region 320C illustrates a larger region form which the particular textual information should be read. The combiner 315C resolves this to actual region 330C. These techniques offer some resistance to illicit motives while also simplifying the texture operations that are performed with a limited storage ability.

Figure 3D:
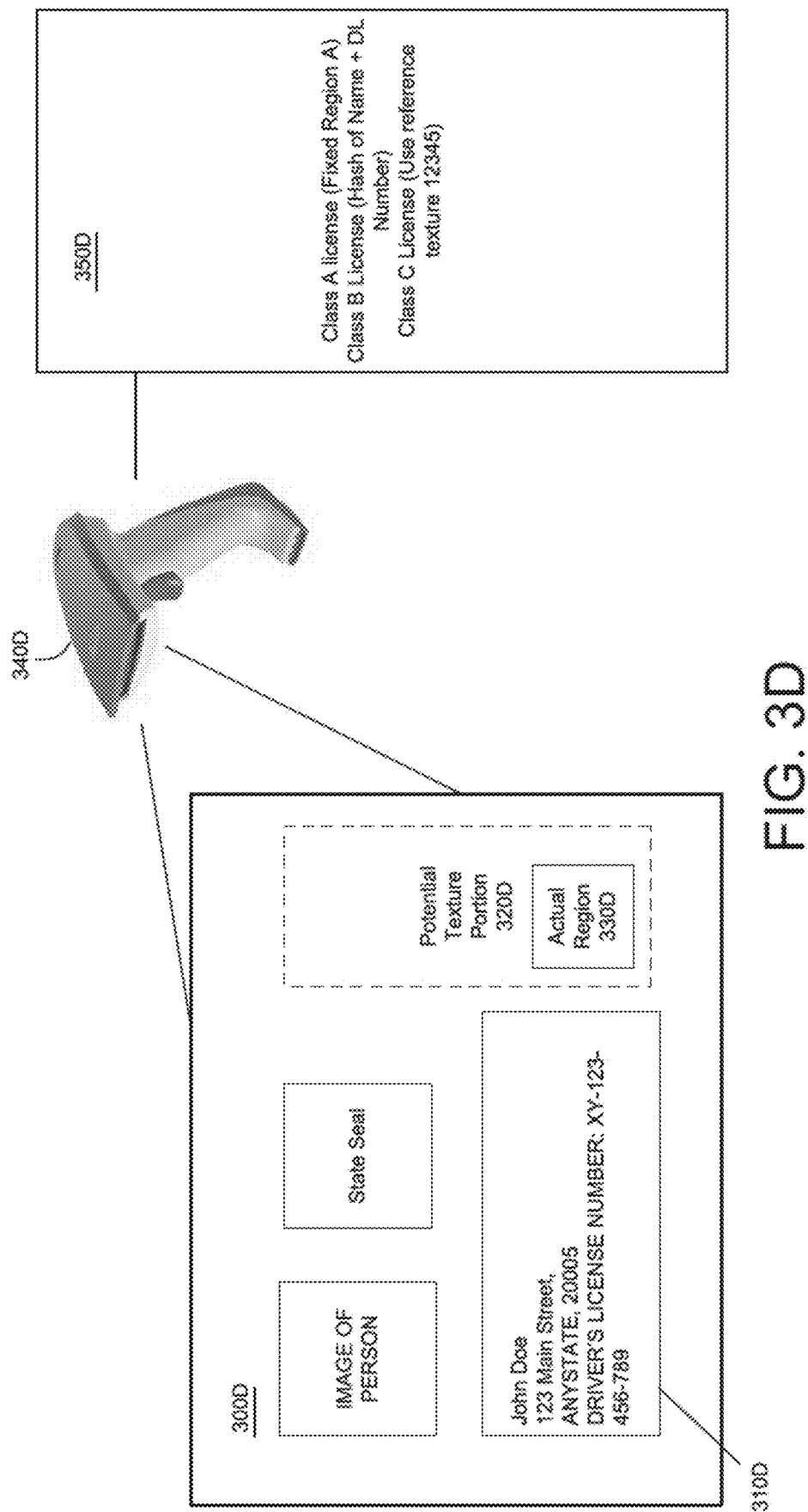

FIG. 3D illustrates how texture can be customized on a broad or narrow basis for particular documents. In the example shown with document 300D, a document scanner 340D (acting as a document inspection station) is able to read one or more aspects of the underlying document. In this case, it can read driver information 310D. The document scanner 340D reference database 350D. For example, all driver's licenses in a certain class of users may share a particular texture map across the underlying document 300D. For class A license, a common texture map may be used at a designated location. Such a common texture map may simplify the computational operations that are performed in field environments, particularly where the inspection device does not feature connectivity or where it has limited memory or optical inspection capability. As shown, while there may be a texture throughout a document within region 320A. For a class B License, the reference value may use a location that reflects a hash of a name plus a driver's license number. For a class C license, the analysis may be performed on region 12345.

Finally, textures can be maintained on a per user basis. For example, a state department of motor vehicles may generate a unique texture at the time of issuance. The texture may be stored centrally in a database of later comparison. The texture may be generated on a randomized (or computationally predictable value) such that no two textures are shared between different documents. This approach may increase the difficulty of forging this class of documents since an illicit actor would be precluded from using an existing template or texture that would later pass muster during optical inspection.

Figure 4A:
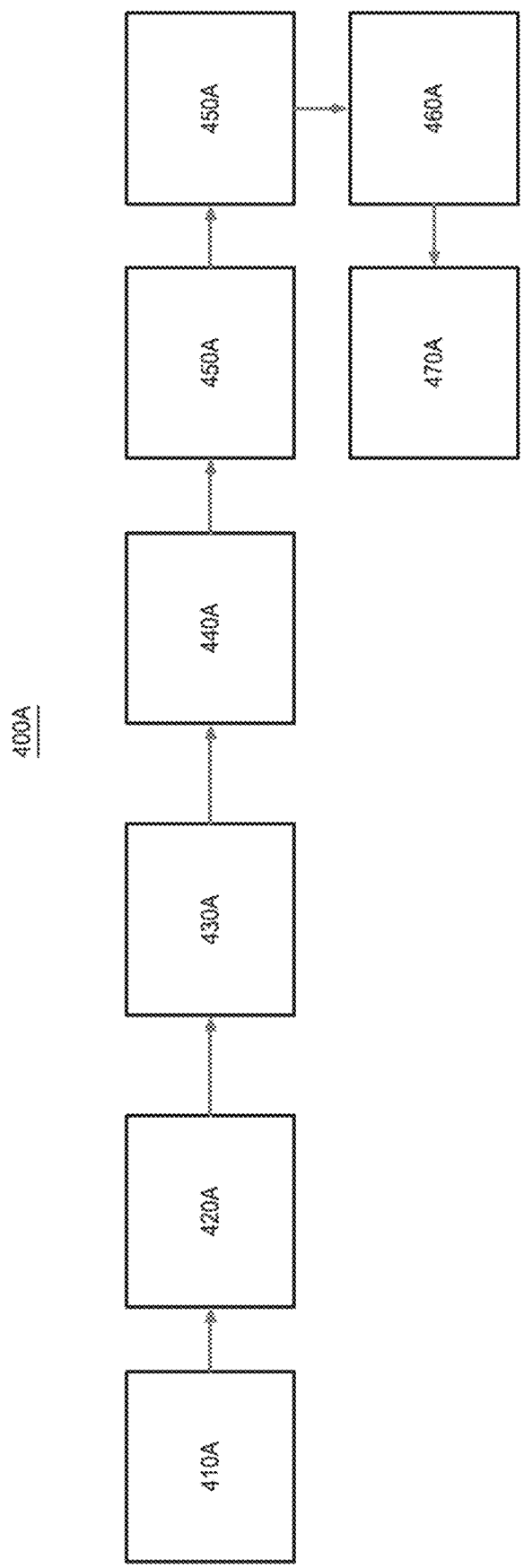
FIGS. 4A and 4B are flow charts of processes by which a first document can be inspected by a second document.
Figure 4B:
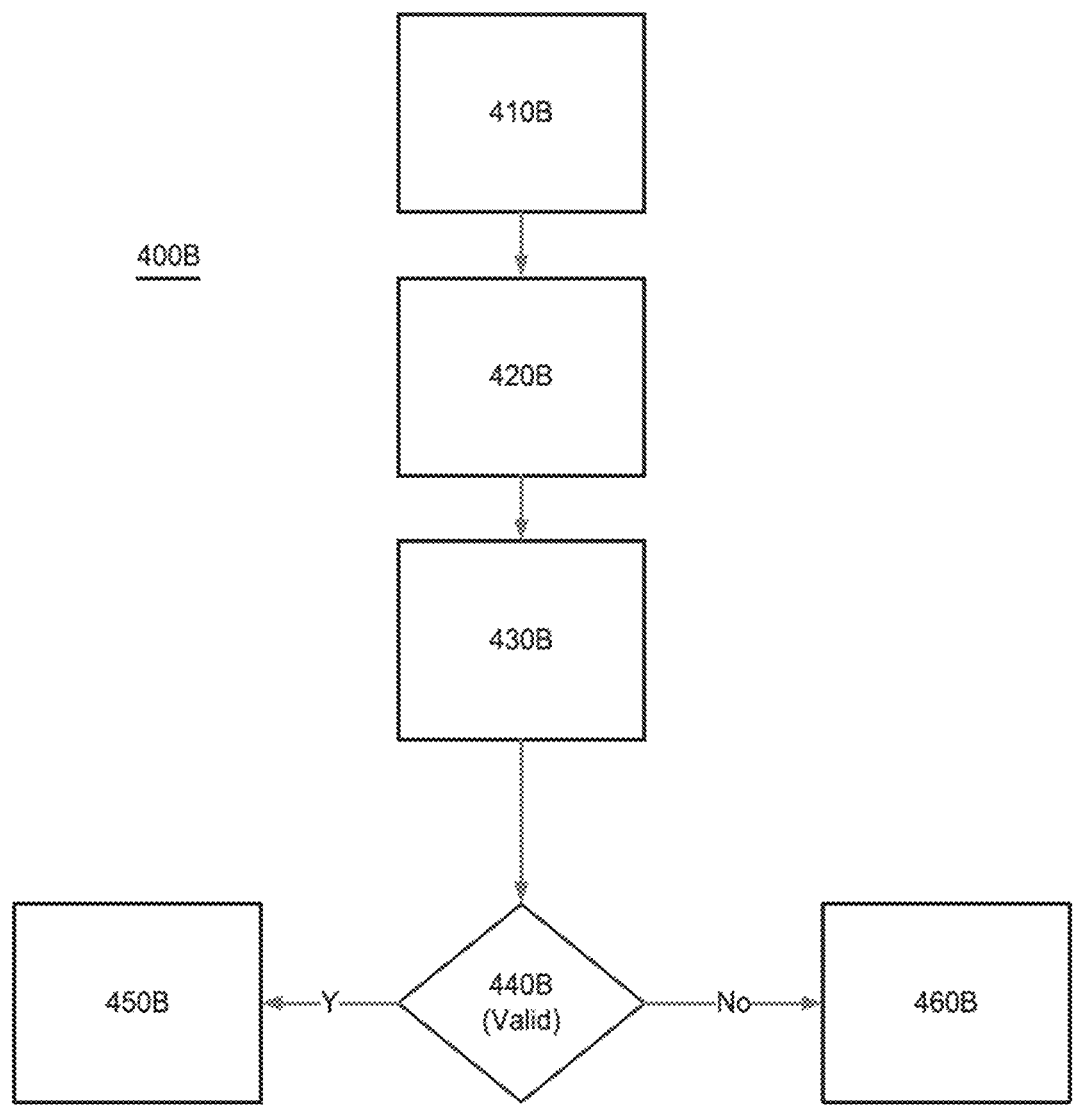

FIGS. 4A and 4B are flow charts of processes by which a first document can be inspected by a second document. Generally, in flow chart 400A, the operations are performed using the systems described above with respect to FIG. 2, using, for example, the texture encoding scheme shown, for example, in FIGS. 3A-3D. Initially, a document inspection system (e.g., a computing device) performs texture analysis on a portion of a first image that represents a first document and on a portion of a second image that represents a second document (410A). For example, a Law Enforcement Office (LEO) may scan a document with a wireless camera configured to determine document validity at secure gateway (e.g., an airport) or during a law enforcement investigation.

Based on performing texture analysis on the portion of the first image that represents the first document, the document inspection system generates a first feature vector that represents the portion of the first image that represents the first document (420A). For example, a box counting method may be used to identify the number of pixels that exceed the mean pixel intensity threshold at various scales. The feature vector may indicate the pixel count for each of several scales. In some configurations, the scale is determined in advance. In other configurations, the scale is dynamically adjust to account for document distance and difficulties in the present optical environment.

Based on performing texture analysis on the portion of the second image that represents the second document, the document inspection system generates a second feature vector that represents the portion of the second image that represents the second document (430A). The second document may be a reference document as set forth above that represents a known standard against which future comparisons are made. In some configurations, the document inspection system is configured to perform validity checks in an autonomous manner, that is, without the assistance of additional devices or databases. In other configurations, the document inspection system is configured to interface with a distributed processing system (e.g., a client server architecture or by consulting a secure database to make a determination). Alternatively or in addition, the document inspection system may be configured to conduct a first validity check if connectivity is not available. If connectivity is available, the document inspection system is configured to take advantage of potentially richer or more secure data that is available from a database. Still, in other configurations, one or more determinations may be made by an interconnected device. For example, a feature vector may be identified by a document scanning station in a field environment. An interconnected server may make the determination as to whether the feature vector possesses a threshold degree of similarity to a reference document. The interconnected server then may return the results to the document inspection station in the field environment.

The document inspection station compares the first feature vector to the second feature vector (440A).

Based on comparing the first feature vector to the second feature vector, the document inspection station determines a confidence score that reflects a likelihood that the first document and the second document are the same document (450A). For example, document inspection station may determine the percentage of constituent elements that differ by less than a threshold percentage of the feature vector for the reference document.

With this information, the document inspection station compares the confidence score to a confidence score threshold (460A). Based on comparing the confidence score to the confidence score threshold, the document inspection station determines whether the confidence score satisfies the confidence score threshold (470A). For example, the document inspection station may determine that 70% of the elements differ by less than a threshold value with the reference document where each of the elements represents a different scale for performing the box counting method.

FIG. 4B is a flow chart 400B of a process by which feature vectors can be generated and compared. Generally, flow chart 400B may be performed in order to first build a feature vector when a document is first inspected. Flow Chart 400B further illustrates the basis by which feature vectors can be compared. Initially, a document inspection station invokes using a box counting method for one or more pixels within the portion of the first image of the first document. Generally, a region of interest has been identified and an image of the inspected document is captured. The box counting method performs an iterative method to count the number of pixels present in the region of interest for each of several dimensions/scales (410B). In particular, the document inspection station invokes a box counting program to identify the number of times that a pixel exceeds an intensity threshold (420B). The intensity threshold may be the mean intensity value for all pixels in the region of interest (or indeed the entire document). At each dimension, a scalar value is stored in a feature vector to indicate the number of times that this has been exceeded (430B). Once the feature vector has been generated for the first and second (reference) documents, the document inspection system will compare their similarity. For each element in the vector and at a given dimension, the number of pixels that exceed the intensity threshold for the pixels for the different scales from the first image is compared to a number of pixels that exceed the intensity threshold for the pixels for the different scales from the second image (440B). If that operation reveals less than a threshold difference (e.g., less than 25% differences for 70% of dimensions), the document may be identified as being valid (450B). If that operation reveals more than a threshold difference, the document may be identified as being invalid (460B).

Based on determining whether the confidence score satisfies the confidence score threshold, the document inspection station determines whether the first document and the second document are the same document (480A). For example, the document inspection station may determine whether the texture alone indicates invalidity of the first document, that is, the document under inspection. Alternatively or in addition, the texture analysis can be used with other indicia to make a global determination about the validity of the document and/or indicate whether further action is warranted by a reviewing authority (e.g., the LEO).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:

performing, by a computing device, texture analysis on a portion of a first image that represents a first document and on a portion of a second image that represents a second document, the texture analysis including measuring a scaling property using a similarity dimension;

based on performing texture analysis on the portion of the first image that represents the first document, generating, by the computing device, a first feature vector that represents the portion of the first image that represents the first document;

based on performing texture analysis on the portion of the second image that represents the second document, generating, by the computing device, a second feature vector that represents the portion of the second image that represents the second document;

comparing, by the computing device, the first feature vector to the second feature vector;

based on comparing the first feature vector to the second feature vector, determining, by the computing device, a confidence score that reflects a likelihood that the first document and the second document are the same document;

comparing, by the computing device, the confidence score to a confidence score threshold;

based on comparing the confidence score to the confidence score threshold, determining, by the computing device, whether the confidence score satisfies the confidence score threshold; and based on determining whether the confidence score satisfies the confidence score threshold, determining, by the computing device, whether the first document and the second document are the same document;

wherein measuring the scaling property includes, for the portion of the first image and for the portion of the second image, relating a measured quantity (Ns) to a scale (s) at which the feature vector representing the portion of the first image and the portion of the second image, respectively, is measured, wherein a similarity dimension for the portion of the first image results from a (log (1/s), log (Ns)) plot of the portion of the first image and a similarity dimension for the portion of the second image results from a (log (1/s), log (Ns)) plot of the portion of the second image.

2. The method of claim 1, comprising:

determining, by the computing device, that the portion of the first image that represents the first document includes only texture; and determining, by the computing device, that the portion of the second image that represents the second document includes only texture.

3. The method of claim 1, wherein:

determining whether the confidence score satisfies the confidence score threshold comprises determining that the confidence score satisfies the confidence score threshold, and determining whether the first document and the second document are the same document comprises determining that the first document and the second document are the same document based on determining that the confidence score satisfies the confidence score threshold.

4. The method of claim 1, wherein:

determining whether the confidence score satisfies the confidence score threshold comprises determining that the confidence score does not satisfy the confidence score threshold, and determining whether the first document and the second document are the same document comprises determining that the first document and the second document are not the same document based on determining that the confidence score does not satisfy the confidence score threshold.

5. The method of claim 1 wherein the portion of the first image includes a region of the first document that only features texture.

6. The method of claim 1 wherein the portion of the first image includes a region of the first document that features texture and text.

7. The method of claim 1 wherein generating the first feature vector includes generating a fractal description for the feature vector from the portion of the first image.

8. The method of claim 1 wherein performing the texture analysis includes: using a box counting method for one or more pixels within the portion of the first image of the first document, the box counting method exceeds an intensity threshold, wherein the box counting method is performed for pixels having different scales;

counting the number of pixels that exceed the intensity threshold for the pixels for the different scales; and wherein comparing the first feature vector to the second feature vector includes:

relating the number of pixels that exceed the intensity threshold for the pixels for the different scales from the first image to a number of pixels that exceed the intensity threshold for the pixels for the different scales from the second image.

9. A document inspection system comprising:

an optical document reader configured to read a first document;

a processor configured to perform operations that include:

performing texture analysis on a portion of a first image that represents a first document and on a portion of a second image that represents a second document, the texture analysis including measuring a scaling property using a similarity dimension;

based on performing texture analysis on the portion of the first image that represents the first document, generating a first feature vector that represents the portion of the first image that represents the first document;

based on performing texture analysis on the portion of the second image that represents the second document, generating a second feature vector that represents the portion of the second image that represents the second document;

comparing the first feature vector to the second feature vector;

based on comparing the first feature vector to the second feature vector, determining a confidence score that reflects a likelihood that the first document and the second document are the same document;

comparing the confidence score to a confidence score threshold;

based on comparing the confidence score to the confidence score threshold, determining whether the confidence score satisfies the confidence score threshold; and based on determining whether the confidence score satisfies the confidence score threshold, determining whether the first document and the second document are the same document;

wherein measuring the scaling property includes, for the portion of the first image and for the portion of the second image, relating a measured quantity (Ns) to a scale (s) at which the feature vector representing the portion of the first image and the portion of the second image, respectively, is measured, wherein a similarity dimension for the portion of the first image results from a (log (1/s), log (Ns)) plot of the portion of the first image and a similarity dimension for the portion of the second image results from a (log (1/s), log (Ns)) plot of the portion of the second image.

10. The document inspection of claim 9 wherein the document inspection system includes a standalone optical reader configured to perform document inspection without accessing a database resident on a second device different than the document inspection system.

11. The document inspection of claim 9 wherein the document inspection system includes a networked optical reader configured to perform document inspection by accessing a database resident on a second device different than the document inspection system.

12. The document inspection system of claim 11 wherein one or more of the operations that include:
(1) performing texture analysis, (2) generating the first feature vector, (3) generating the second feature vector that represents the portion of the second image that represents the second document, (3) comparing the first feature vector to the second feature vector, (4) determining the confidence score, (5) comparing the confidence score to the confidence score threshold, (6) determining whether the confidence score satisfies the confidence score threshold, and (7) determining whether the first document and the second document are the same document,
are performed on the second device different than the document inspection system.

13. The system of claim 9, wherein the processor is configured to perform operations that include:

determining that the portion of the first image that represents the first document includes only texture; and
determining that the portion of the second image that represents the second document includes only texture.

14. The document inspection system of claim 9, wherein the processor is configured to perform operations that include:
determining whether the confidence score satisfies the confidence score threshold comprises determining that the confidence score satisfies the confidence score threshold, and
determining whether the first document and the second document are the same document comprises determining that the first document and the second document are the same document based on determining that the confidence score satisfies the confidence score threshold.

15. The document inspection system of claim 9, wherein:
determining whether the confidence score satisfies the confidence score threshold comprises determining that the confidence score does not satisfy the confidence score threshold, and
determining whether the first document and the second document are the same document comprises determining that the first document and the second document are not the same document based on determining that the confidence score does not satisfy the confidence score threshold.

16. The document inspection system of claim 9 wherein performing the texture analysis includes: using a box counting method for one or more pixels within the portion of the first image of the first document, the box counting method exceeds an intensity threshold, wherein the box counting method is performed for pixels having different scales;
counting the number of pixels that exceed the intensity threshold for the pixels for the different scales; and
wherein comparing the first feature vector to the second feature vector includes:
relating the number of pixels that exceed the intensity threshold for the pixels for the different scales from the first image to a number of pixels that exceed the intensity threshold for the pixels for the different scales from the second image.

* * * * *